(12) United States Patent
Yang

(10) Patent No.: US 8,322,850 B2
(45) Date of Patent: Dec. 4, 2012

(54) EYEGLASS DEVICE

(75) Inventor: Shun-Tien Yang, Tainan (TW)

(73) Assignee: All-Logic Int. Co., Ltd., Tainan (TW)

( * ) Notice: Subject to any disclaimer, the term of this patent is extended or adjusted under 35 U.S.C. 154(b) by 139 days.

(21) Appl. No.: 13/044,308

(22) Filed: Mar. 9, 2011

(65) Prior Publication Data

US 2012/0229753 A1 Sep. 13, 2012

(51) Int. Cl.
*G02C 5/14* (2006.01)
(52) U.S. Cl. .................... 351/122; 351/119; 351/123
(58) Field of Classification Search .............. 351/41, 351/111, 119–123
See application file for complete search history.

(56) References Cited

U.S. PATENT DOCUMENTS

| 3,055,267 | A | * | 9/1962 | Catt | 351/111 |
| 4,712,893 | A | * | 12/1987 | Anger | 351/123 |
| 4,925,291 | A | * | 5/1990 | Anger et al. | 351/123 |

* cited by examiner

*Primary Examiner* — Huy K Mai
(74) *Attorney, Agent, or Firm* — Marger Johnson & McCollom PC

(57) ABSTRACT

An eyeglass device includes a lens unit and a pair of temple pieces connected to the lens unit. Each temple piece includes a rigid upper portion and a soft lower portion. The rigid upper portion has a rigid front end connected to the lens unit, and a rigid rear end. The soft lower portion has a front soft section disposed below and connected to the rigid front end, a rear soft section connected to the rigid rear end, and an intermediate soft section disposed between the front and rear soft sections and below the rigid upper portion. The intermediate soft section and the rigid upper portion cooperatively define an elongate gap therebetween. The soft lower portion has a bottom abutment face extending from the front soft section to the rear soft section for contacting a user's ear.

4 Claims, 3 Drawing Sheets

EYEGLASS DEVICE

BACKGROUND OF THE INVENTION

1. Field of the Invention

The invention relates to an eyeglass device.

2. Description of the Related Art

The general structure of an eyeglass device includes a lens unit and a pair of temple pieces connected to the lens unit. The pair of temple pieces are generally made of plastic having a proper hardness. The weight of a pair of eyeglasses is almost completely borne by a wearer's ears and nose. Thus, the hard plastic temple pieces hung on the ears and abutted against the face of the wearer for a long wearing time usually lead to uncomfortable feeling for the wearer.

SUMMARY OF THE INVENTION

The object of the present invention is to provide an eyeglass device that can overcome the aforesaid drawbacks of the prior art, and provide relatively comfortable feeling for a wearer.

The eyeglass device according to the present invention comprises a lens unit and a pair of temple pieces connected to the lens unit. Each of the temple pieces includes a rigid upper portion and a soft lower portion. The rigid upper portion has a rigid front end connected to the lens unit, and a rigid rear end. The soft lower portion has a front soft section disposed below and connected to the rigid front end, a rear soft section connected to the rigid rear end, and an intermediate soft section disposed between the front and rear soft sections and below the rigid upper portion. The intermediate soft section and the rigid upper portion cooperatively define an elongate gap therebetween. The soft lower portion has a bottom abutment face extending from the front soft section to the rear soft section for contacting an ear of a user.

BRIEF DESCRIPTION OF THE DRAWINGS

The above and other features and advantages of the present invention will become apparent in the following detailed description of the preferred embodiment with reference to the accompanying drawings, of which.

DETAILED DESCRIPTION OF THE PREFERRED EMBODIMENT

Figure 1:
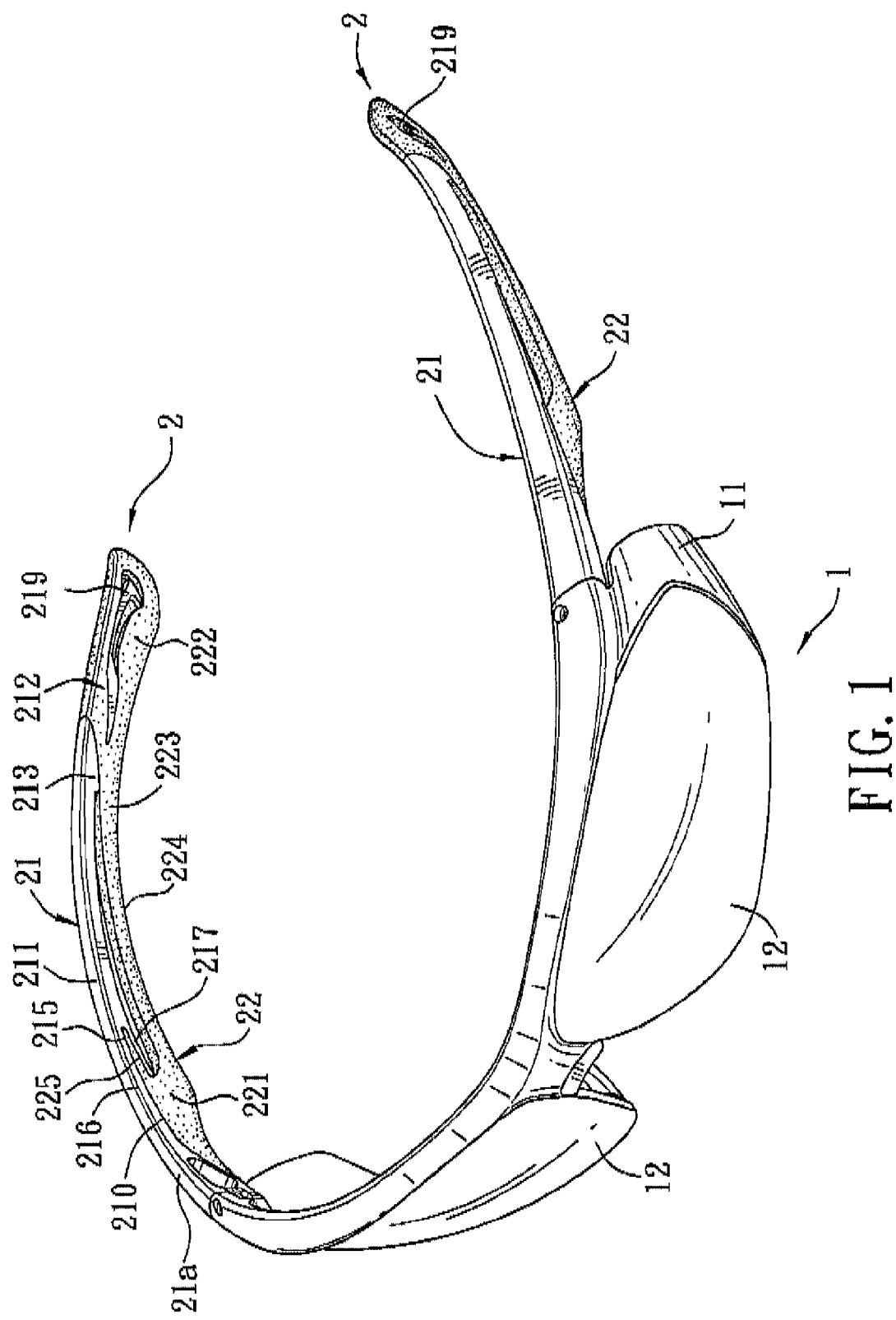
FIG. 1 is a perspective view of a preferred embodiment of an eyeglass device of this invention.
Figure 2:
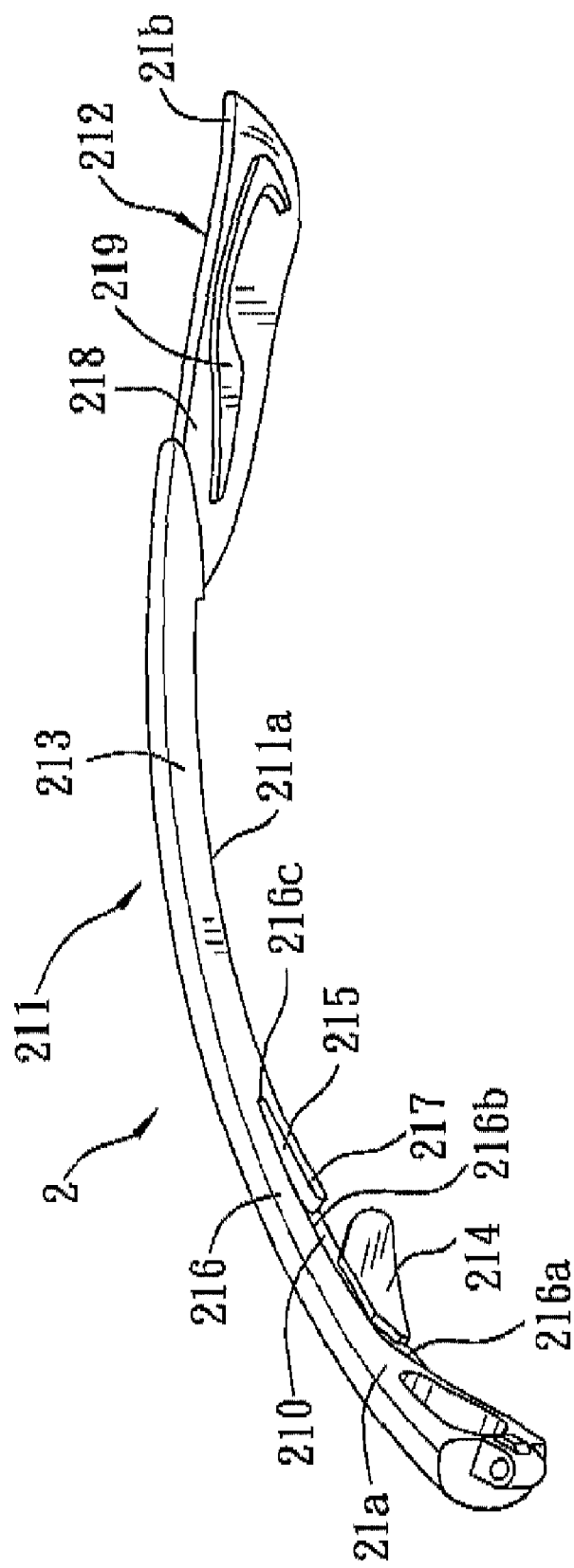
FIG. 2 is a perspective view illustrating a rigid upper portion of a temple piece of the preferred embodiment shown in FIG. 1.
Figure 3:
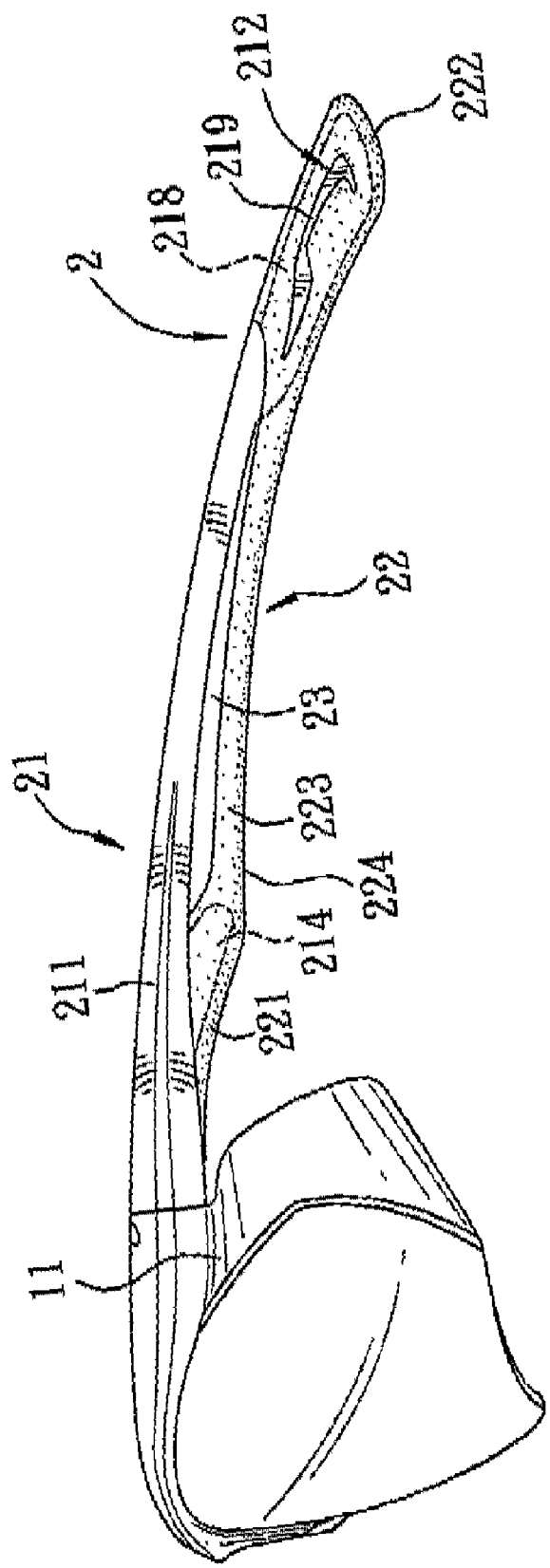
FIG. 3 is a side elevation view of the preferred embodiment shown in FIG. 1.

FIGS. 1, 2 and 3 show a preferred embodiment of an eyeglass device of the present invention. The eyeglass device comprises a lens unit 1 and a pair of temple pieces 2 connected to the lens unit 1. In this preferred embodiment, the lens unit 1 of the eyeglass device of this invention has two eyeglass lenses 12. It should be noted that the eyeglass device of this invention can has only one eyeglass lens. In this preferred embodiment, the eyeglass device further includes a pair of interconnected rims 11, each of which surrounds and supports a respective one of the eyeglass lenses 12. It should be also noted that the eyeglass device can be a rimless eyeglass, and thus the rims 11 can be dispensed with.

Each of the temple pieces 2 includes a rigid upper portion 21 made of a hard plastic material, e.g., polycarbonate, and a soft lower portion 22 made from a soft plastic material, e.g., thermoplastic rubber. In other words, the soft lower portion 22 is made from a plastic material softer than that of the rigid upper portion 21.

The rigid upper portion 21 has a rigid front end 21a connected to one of the rims 11, and a rigid rear end 21b. The rigid upper portion 21 has a rigid main segment 211 having the rigid front end 21a, and a rigid tail segment 212 having the rigid rear end 21b. The rigid tail segment 212 includes a tail body 218 and a projection 219 projecting from a surface of the tail body 218.

The soft lower portion 22 has a front soft section 221 disposed below and connected to the rigid front end 21a, a rear soft section 222 connected to the rigid rear end 21b, and an intermediate soft section 223 disposed between the front and rear soft sections 221, 222 and below the rigid upper portion 21. The intermediate soft section 223 and the rigid upper portion 21 cooperatively define an elongate gap 23 therebetween. The soft lower portion 22 has a bottom abutment face 224 extending from the front soft section 221 to the rear soft section 222 for contacting an ear of a user.

Preferably, the rigid main segment 211 of the rigid upper portion 21 of each of the temple pieces 2 further has a bottom surface 211a, an inner surface 213 facing the other one of the temple pieces 2, an indented part 210 formed in the inner surface 213 adjacent to the bottom surface 211a, a non-indented part 216 that is formed in the inner surface 213 and that has front, lateral and rear edges 216a, 216b, and 216c bounding the indented part 210, a tongue 217 protruding frontwardly into the indented part 210 from the rear edge 216e, a groove 215 formed between the tongue 217 and the lateral edge 216b of the non-intended part 216 and defined by a substantially V-shaped wall, and a protrusion 214 formed in and protruding from the indented part 210.

The front soft section 221 encloses the bottom surface 211a, the indented part 210 and the protrusion 214, and has a finger portion 225 engaging the groove 215. The rear soft section 222 encloses the tail body 218 of the rigid tail segment 212, and the projection 219 extends outwardly of the rear soft section 222. The aforesaid structural arrangement of the rigid upper portion 21 and the soft lower portion 22 improves the connecting stability therebetween.

The temple of the present invention is made using a bi-injection method. The rigid upper portion 21 is firstly made and the soft lower portion 22 is then formed by injection to combine with the rigid upper portion 21 so as to result in the temple piece 2 of the present invention.

Since the eyeglass device of the present invention contacts a wearer's ears through the soft lower portion 22, the same can provide a relatively comfortable feeling for the wearer. Besides, when the eyeglass device is worn by the wearer, the elongate gap 23 formed between the intermediate soft section 223 and the rigid upper portion 21 provides a space for deformation of the soft lower portion 22, thereby reducing the stress from the eyeglass device for the wearer.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An eyeglass device, comprising:
   a lens unit; and
   a pair of temple pieces connected to said lens unit, each of said temple pieces including a rigid upper portion and a soft lower portion, said rigid upper portion having a rigid front end connected to said lens unit, and a rigid rear end, said soft lower portion having a front soft section disposed below and connected to said rigid front end, a rear soft section connected to said rigid rear end, and an intermediate soft section disposed between said front and rear soft sections and below said rigid upper portion, said intermediate soft section and said rigid upper portion cooperatively defining an elongate gap therebetween, said soft lower portion having a bottom abutment face extending from said front soft section to said rear soft section for contacting an ear of a user.

2. The eyeglass device of claim 1, wherein said rigid upper portion has a rigid main segment having said rigid front end, and a rigid tail segment having said rigid rear end and including a projection, said rear soft section enclosing said rigid tail segment, said projection extending outwardly of said rear soft section.

3. The eyeglass device of claim 2, wherein said rigid main segment of said rigid upper portion of each of said temple pieces further has a bottom surface, an inner surface facing the other one of said temple pieces, an indented part formed in said inner surface adjacent to said bottom surface, a non-indented part that is formed in said inner surface and that has front, lateral and rear edges bounding said indented part, and a tongue protruding frontwardly into said indented part from said rear edge of said non-indented part, and a groove formed between said tongue and said lateral edge of said non-intended part and defined by a substantially V-shaped wall, said front soft section enclosing said bottom surface and said indented part and having a finger portion engaging said groove.

4. The eyeglass device of claim 2, wherein said rigid main segment of said rigid upper portion of each of said temple pieces further has a bottom surface, an inner surface facing the other one of said temple pieces, an indented part formed in said inner surface adjacent to said bottom surface, a non-indented part that is formed in said inner surface and that has front, lateral and rear edges bounding said indented part, and a protrusion formed in and protruding from said indented part, said front soft section enclosing said bottom surface, said indented part and said protrusion.

* * * * *